US010083129B2

(12) United States Patent
Tsirkin

(10) Patent No.: US 10,083,129 B2
(45) Date of Patent: Sep. 25, 2018

(54) CODE LOADING HARDENING BY HYPERVISOR PAGE TABLE SWITCHING

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 200 days.

(21) Appl. No.: 15/250,463

(22) Filed: Aug. 29, 2016

(65) Prior Publication Data

US 2018/0060249 A1 Mar. 1, 2018

(51) Int. Cl.
| | |
|---|---|
| *G06F 12/14* | (2006.01) |
| *G06F 12/1009* | (2016.01) |
| *H04L 9/32* | (2006.01) |
| *G06F 9/445* | (2018.01) |
| *G06F 9/455* | (2018.01) |

(52) U.S. Cl.
CPC .......... *G06F 12/1408* (2013.01); *G06F 9/445* (2013.01); *G06F 9/45558* (2013.01); *G06F 12/1009* (2013.01); *H04L 9/3247* (2013.01); *G06F 2009/45583* (2013.01); *G06F 2009/45587* (2013.01); *G06F 2212/1052* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 7,584,473 | B2 * | 9/2009 | Forin | G06F 9/4411 717/147 |
| 8,239,673 | B2 | 8/2012 | Shankar et al. | |
| 8,407,515 | B2 * | 3/2013 | Heyrman | G06F 11/2094 714/6.12 |
| 8,799,879 | B2 | 8/2014 | Wright et al. | |
| 9,038,176 | B2 * | 5/2015 | Sallam | G06F 21/554 718/1 |
| 9,183,161 | B2 | 11/2015 | Hildesheim et al. | |
| 9,195,487 | B2 | 11/2015 | Adams | |

(Continued)

OTHER PUBLICATIONS

Elwell et al. "Hardening Extended Memory Access Control Schemes with Self-Verified Address Spaces", 978-1-5386-3093-8/17, IEEE '17.*

(Continued)

*Primary Examiner* — Peter Poltorak
(74) *Attorney, Agent, or Firm* — Haynes and Boone, LLP

(57) ABSTRACT

Systems and methods are provided for modifying one or more guest memory permissions. An example method includes receiving a request to modify a memory permission of a guest running on a virtual machine. The guest includes a kernel that includes loading code and kernel code. The method also includes determining whether the request was sent from the loading code. The loading code corresponds to a first set of hypervisor page tables and is stored at a first range of memory addresses, and the kernel code corresponds to a second set of hypervisor page tables. The first range of memory addresses is in an executable mode in the first set of hypervisor page tables. The method further includes in response to a determination that the request was sent from the loading code, modifying the guest's memory permission in the second set of hypervisor page tables in accordance with the request.

20 Claims, 8 Drawing Sheets

(56) References Cited

U.S. PATENT DOCUMENTS

| | | | |
|---|---|---|---|
| 9,256,552 B2 | 2/2016 | Epstein | |
| 9,400,885 B2* | 7/2016 | Tosa | G06F 21/554 |
| 9,703,726 B2* | 7/2017 | Lutas | G06F 12/145 |
| 2006/0026385 A1* | 2/2006 | Dinechin | G06F 12/1036 711/210 |
| 2006/0259818 A1* | 11/2006 | Howell | G06F 9/45558 714/21 |
| 2013/0007325 A1* | 1/2013 | Sahita | G06F 13/24 710/267 |
| 2013/0132690 A1* | 5/2013 | Epstein | G06F 12/1416 711/159 |
| 2013/0191577 A1* | 7/2013 | Thomas | G06F 12/1009 711/6 |
| 2015/0089502 A1 | 3/2015 | Horovitz et al. | |
| 2016/0092678 A1* | 3/2016 | Probert | G06F 9/45558 713/193 |
| 2017/0242719 A1* | 8/2017 | Tsirkin | G06F 9/45558 |
| 2017/0262306 A1* | 9/2017 | Wang | G06F 9/45558 |
| 2017/0286673 A1* | 10/2017 | Lukacs | G06F 21/554 |
| 2017/0286694 A1* | 10/2017 | Swidowski | G06F 9/45558 |
| 2017/0344494 A1* | 11/2017 | Thomas | G06F 12/145 |
| 2018/0032447 A1* | 2/2018 | Kaplan | G06F 12/1425 |

OTHER PUBLICATIONS

Wang et al. Design and Implementation of SecPod, A Framework for Virtualization-based Security Systems DOI: 10.1109/TDSC. 2017.2675991, ISSN: 1545-5971, IEEE Transactions on Dependable and Secure Computing (vol. PP, Issue: 99, p. 1), Feb. 2017.*

Nathan E. Rosenblum, Gregory Cooksey, Barton P. Miller, "Virtual Machine-Provided Context Sensitive Page Mappings", Computer Sciences Department, University of Wisconsin-Madison, Mar. 2008, ftp://ftp.cs.wisc.edu/paradyn/papers/Rosenblum08cspm.pdf.

Kernel-guard, http://gentoo-hardened.gentoo.narkive.com/9t16yPd0/kernel-guard.

Sven Vermeulen, Checksec Kernel Security, Jul. 24, 2011, http://blog.siphos.be/2011/07/checksec-kernel-security/.

Taylor Merry, "Linux Kernel Hardening", Nov. 18, 2003, https://www.sans.org/reading-room/whitepapers/linux/linux-kernel-hardening-1294.

\* cited by examiner

CODE LOADING HARDENING BY HYPERVISOR PAGE TABLE SWITCHING

BACKGROUND

The present disclosure generally relates to computing devices, and more particularly to handling a request to modify memory permissions.

A virtual machine is software that is executed on hardware to create a virtualization of a physical computer system. Virtual machines may function as self-contained platforms that run their own operating systems and software applications. A host machine, such as a server computer may concurrently run one or more virtual machines using a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each virtual machine guest operating system may be accessed by one or more local or remote clients to perform computing tasks.

BRIEF SUMMARY

Methods, systems, and techniques for modifying one or more guest memory permissions stored in a hypervisor page table are provided.

An example method of modifying one or more guest memory permissions stored in a hypervisor page table includes receiving, by a hypervisor, a request to modify a memory permission of a guest running on a virtual machine. The virtual machine and hypervisor run on a host machine. The guest includes a kernel that includes loading code and kernel code. The method also includes determining, by the hypervisor, whether the request was sent from the loading code. The loading code corresponds to a first set of hypervisor page tables and is stored at a first range of memory addresses. The kernel code corresponds to a second set of hypervisor page tables. The first range of memory addresses is in an executable mode in the first set of hypervisor page tables. The method further includes in response to a determination that the request was sent from the loading code, modifying, by the hypervisor, the guest's memory permission in the second set of hypervisor page tables in accordance with the request.

An example system for modifying one or more guest memory permissions stored in a hypervisor page table includes a guest memory storing loading code and kernel code. The loading code is stored at a first range of memory addresses in the guest memory. The system includes a hypervisor memory storing first and second sets of hypervisor page tables. The loading code corresponds to the first set of hypervisor page tables. The kernel code corresponds to the second set of hypervisor page tables. The first range of memory addresses is in an executable mode in the first set of hypervisor page tables. The system also includes a guest that runs on a virtual machine and sends a request to modify a memory permission of the guest. The guest includes a kernel that includes the loading code and kernel code. The system further includes a hypervisor that determines whether the request to modify the memory permission of the guest was sent from the loading code. In response to a determination that the request was sent from the loading code, the hypervisor modifies the guest's memory permission in the second set of hypervisor page tables in accordance with the request.

An example non-transitory machine-readable medium includes a plurality of machine-readable instructions that when executed by one or more processors are adapted to cause the one or more processors to perform a method including: receiving, by a hypervisor, a request to modify a memory permission of a guest running on a virtual machine, the virtual machine and hypervisor running on a host machine, and the guest including a kernel that includes loading code and kernel code; determining, by the hypervisor, whether the request was sent from the loading code, the loading code corresponding to a first set of hypervisor page tables and being stored at a first range of memory addresses, the kernel code corresponding to a second set of hypervisor page tables, and the first range of memory addresses being in an executable mode in the first set of hypervisor page tables; and in response to a determination that the request was sent from the loading code, modifying, by the hypervisor, the guest's memory permission in the second set of hypervisor page tables in accordance with the request.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
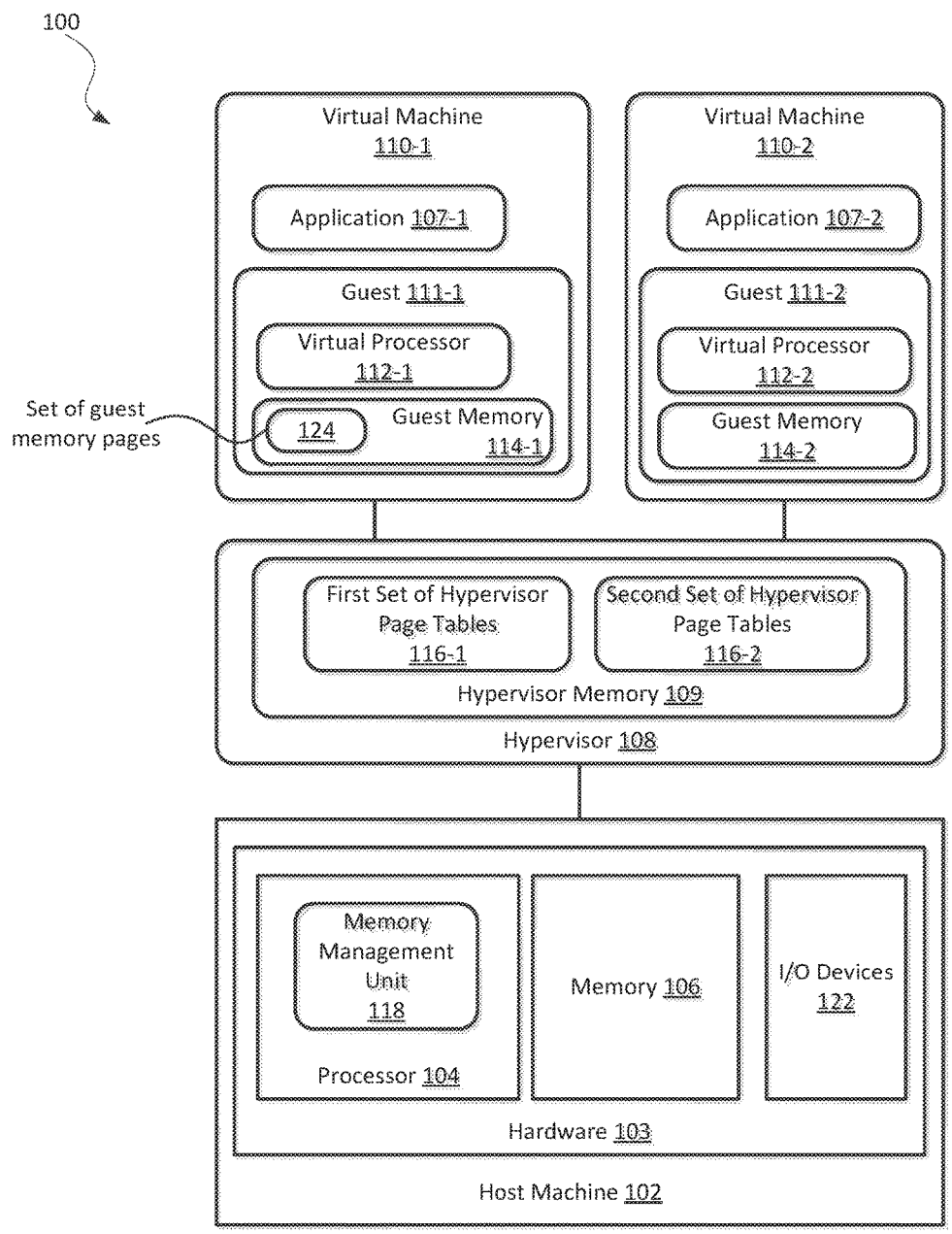
FIG. 1 is an example diagram showing a host system.

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A process having supervisor or kernel privileges (e.g., ring 0 for x86 processor architecture family) may be able to modify any memory in the system, including kernel code. The process may exploit kernel code, remove write protection from memory pages of the kernel, and potentially escalate the exploit to other parts of the kernel. To reduce security vulnerabilities, some processor technologies support the write protection of certain parts of kernel memory. For example, some processor technologies support write protection of executable code. A memory page set to a writeable mode is modifiable while the memory page is set to such a mode. A memory page in the writeable mode may also be referred to as a writeable memory page or a modifiable memory page. In contrast, a memory page set to a write-protected mode is not modifiable while the memory page is set to such a mode. A memory page in the write-protected mode may also be referred to as a write-protected memory page or a non-modifiable memory page.

One way to modify a set of write-protected memory pages is to remove the write protection from the set, modify the set, and reinforce the write protection at a later point in time. Modifying guest memory permissions may be done by simply flipping a bit in a page table that stores the guest's access permissions. Accordingly, the guest's memory permissions may be easily modified. A conventional technique to overcome this problem is to add a hypercall(s) requesting the hypervisor to protect the guest's memory permissions in the hypervisor page tables. In this example, the guest may invoke a hypercall that causes the hypervisor to protect guest memory permissions.

The guest's memory permissions may be permanent or non-permanent. If the guest's memory permissions are permanent, they are non-modifiable and cannot be removed once permissions are set for a memory page. Although this may offer security in ensuring that the applicable memory permissions are not tampered with, it may be impractical to protect kernel memory in this way. For example, many technologies (e.g., loadable kernel modules and core dumps) load new code text into a kernel while it is executing. Accordingly, it may be desirable to allow memory permissions to be modified and allow code loading. In another example, the guest's memory permissions are non-permanent. If the guest's memory permissions are non-permanent, they are modifiable (and thus allow loading code) once permissions are set for a memory page. As new code is loaded, however, the risk of memory permissions being inadvertently or maliciously modified or disabled increases, potentially leading to security risks.

Additionally, both of the above examples protect memory at page granularity. In these examples, to modify a memory page, the memory page is temporarily set to the writable mode, and during this window malicious code may be able to modify unrelated data in the same memory page. A similar problem occurs with protecting guest page table memory because multiple page table entries reside in the same memory page. For example, to modify a page table entry in a page table, the hypervisor may remove the write protection from the memory page storing the page table and modify the particular page table entry. During this window, malicious code may be able to modify unrelated data in the same memory page.

The present disclose provides techniques to securely modify one or more write-protected memory pages. Unless specifically stated otherwise, as apparent from the following discussion, it is appreciated that throughout the description, discussions utilizing terms such as "determining," "storing," "detecting," "receiving," "sending," "loading," "executing," "identifying," "modifying," "transferring," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is an example diagram showing an illustrative host system 100. According to the present example, a physical system, such as host machine 102 includes hardware 103 such as processor 104 for executing software (e.g., machine-readable instructions) and using or updating data stored in memory 106. Hardware 103 may include more than one processor 104. A "processor" may also be referred to as a "CPU" or "physical processor" herein. A processor shall refer to a device capable of executing instructions encoding arithmetic, logical, or I/O operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 106 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system, a hypervisor 108, and various other software applications. Hardware 103 may include other I/O devices 122.

Host machine 102 may be coupled over a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Host machine 102 may run one or more virtual machines that run applications 107 and services. A hypervisor 108 manages resources of host machine 102 and makes them available to one or more guests that may be alternately or concurrently executed by host machine 102. Hypervisor 108 may manage hardware resources and arbitrate requests of the multiple guests. For example, hypervisor 108 may present a virtual set of processors, memory, input/output (I/O), and disk resources to each guest based on the physical hardware and/or based on a standard and consistent selection of custom hardware. A virtual machine is provided its own address space in memory, its own processor resource allocation, and its own device I/O using its own virtual devices.

Virtual machines 110 are platforms on which OSs referred to as guest OSs run. A guest OS may be referred to as a "guest." A guest 111-1 running on the first virtual machine 110-1 may be a different OS than guest 111-2 running on the second virtual machine 110-2. A guest may also be a different OS than the OS running on host machine 102. In the example illustrated in FIG. 1, hypervisor 108 supports a first virtual machine 110-1 having a first virtual processor 112-1 and a first guest memory 114-1. Hypervisor 108 also supports a second virtual machine 110-2 having a second virtual processor 112-2 and a second guest memory 114-2. Although two virtual machines 110 are illustrated, host system 100 may include fewer than or more than two virtual machines.

The hardware resources of host machine 102 are shared among hypervisor 108 and one or more guests. Hypervisor 108 may map a virtual resource or state (e.g., registers, memory, or files) to resources in the underlying host machine 102. A guest 111-1, 111-2 may execute one or more applications 107-1, 107-2 that use resources of host machine 102. An application running on guest 111 may access a kernel through the use of system calls. The kernel abstracts components of hardware on a high level such that the application may send a request that is processed by a hardware device, without knowing the fine details of the hardware device. To interact with the hardware device, the application may invoke a system call into the kernel. For example, an application may send an I/O request to the kernel via a system call to request that a particular hardware device perform a particular action. A system call may refer to a request by an active process for a service performed by the kernel. An example request may be a write request to one or more memory pages. An active process is a process that is currently processing in processor 104, as contrasted with a process that is waiting for its next turn in processor 104. I/O may be any program, operation, or device that transfers data to or from processor 104 and to or from a hardware device (e.g., disk drives, keyboards, mice, and printers).

An application may have one or more processes executing on host machine 102. A process is an executing instance of a program. A guest may use a memory management technique called virtual memory, which maps virtual addresses used by an application into physical addresses in memory 106. Processor 104 includes a memory management unit (MMU) 118 that supports the use of virtual memory. With MMU 118, memory addresses may go through a translation step from a virtual address to a physical address prior to each memory access. In a virtual memory system, the addresses seen by user programs do not directly correspond to the physical addresses used by the hardware. Hypervisor 108 presents guest memory 114-1 to virtual machine 110-1 and presents guest memory 114-2 to virtual machine 110-2. Hypervisor 108 maps guest physical memory addresses of guest memory 114 to host physical memory addresses of memory 106 using page tables. Host physical memory refers to the memory that is visible by hypervisor 108 as available on the system. Guest physical memory refers to the memory that is visible to the guest running in the virtual machine and is backed by host physical memory. Hypervisor 108 may sit between the guest physical memory and MMU 118 on processor 104. Memory 106 may include random access memory (RAM), and MMU 118 may divide the RAM into pages. A page is a contiguous section of memory of a set size that is handled by MMU 118 as a single entity. Guest virtual memory refers to a continuous virtual address space presented by the guest to one or more applications. The guest may present a virtual address space to the applications running on the guest. Guest virtual memory is visible to the applications running inside the virtual machine.

Virtual memory addresses may be mapped to physical memory addresses using one or more data structures. A data structure may be a page table. A page table may be a guest page table or a hypervisor page table. A guest page table is a data structure in virtual memory that stores mappings between the guest virtual addresses and the guest physical addresses. Hypervisor 108 includes a hypervisor memory 109 that stores data maintained by the hypervisor. Hypervisor memory 109 includes a set of hypervisor page tables 116-1, 116-2. A hypervisor page table is a data structure in hypervisor memory 109 that stores mappings between the guest physical addresses of guest memory 114 and the host physical addresses of memory 106. A hypervisor page table may also be referred to as an Extended Page Table (EPT). In some examples, hypervisor 108 maintains the virtual-to-physical page mappings in a set of shadow page tables. In some examples, a hypervisor page table may refer to a hypervisor data structure from which the hypervisor constructs the EPTs or the shadow page tables.

Additionally, a hypervisor page table may store access permissions for one or more memory pages (e.g., in guest memory 114). Examples of access permission modes are read-only, write-only, write-protected (e.g., read-execute only), read-write only, and read-write-execute only. In the example illustrated in FIG. 1, first set of hypervisor page tables 116-1 or second set of hypervisor page tables 116-2 may include one or more page table entries, where a page table entry specifies a guest memory page allocated to a guest and the access permissions of the guest memory page. A page table entry may have a permission bit indicating whether the memory page is writable, a permission bit indicating whether the memory page is readable, and a permission bit indicating whether the memory page is executable. In the present disclosure, if a range of memory addresses is in a particular mode (e.g., write-protected mode) in a set of hypervisor page tables, then the memory pages located within the range of memory addresses are also in the particular mode (e.g., write-protected mode). If a memory page is executable in the EPT, the memory page might not be executable in the guest because the guest can remove execute permission.

Guest memory 114-1 includes a set of guest memory pages 124. In an example, hypervisor 108 sets set of guest memory pages 124 to the writable mode in a hypervisor page table. In this example, set of guest memory pages 124 is modifiable. Accordingly, an entity (e.g., application or guest) is able to modify set of guest memory pages 124, and may be able to read or execute set of guest memory pages 124 depending on whether the access permissions allow such an access. In another example, hypervisor 108 sets set of guest memory pages 124 to the write-protected mode in a hypervisor page table. In this example, set of guest memory pages 124 is not modifiable. Hypervisor 108 may set the set of guest memory pages 124 to the write-protected mode to prevent modification of the set of guest memory pages. Accordingly, an entity is unable to modify set of guest memory pages 124, but may be able to read or execute set of guest memory pages 124 depending on whether the access permissions allow such an access. Set of guest memory pages 124 may store, for example, loading code or guest page tables. Loading code may include, for example, executable code that validates a request to perform an action (e.g., modify guest memory permissions) or sends the request to hypervisor 108 to perform the action.

In another example, hypervisor 108 sets the set of guest memory pages 124 to the read-only mode in a hypervisor page table. Accordingly, an entity is able to read set of guest memory pages 124, but is unable to modify or execute the set of guest memory pages. In another example, hypervisor 108 sets the set of guest memory pages 124 to the read-write mode in a hypervisor page table. In this example, set of guest memory pages 124 is readable and modifiable while in the read-write mode. Accordingly, an entity is able to read from and write to set of guest memory pages 124, and may be able to execute set of guest memory pages 124 depending on whether the access permissions allow such an access.

Figure 2:
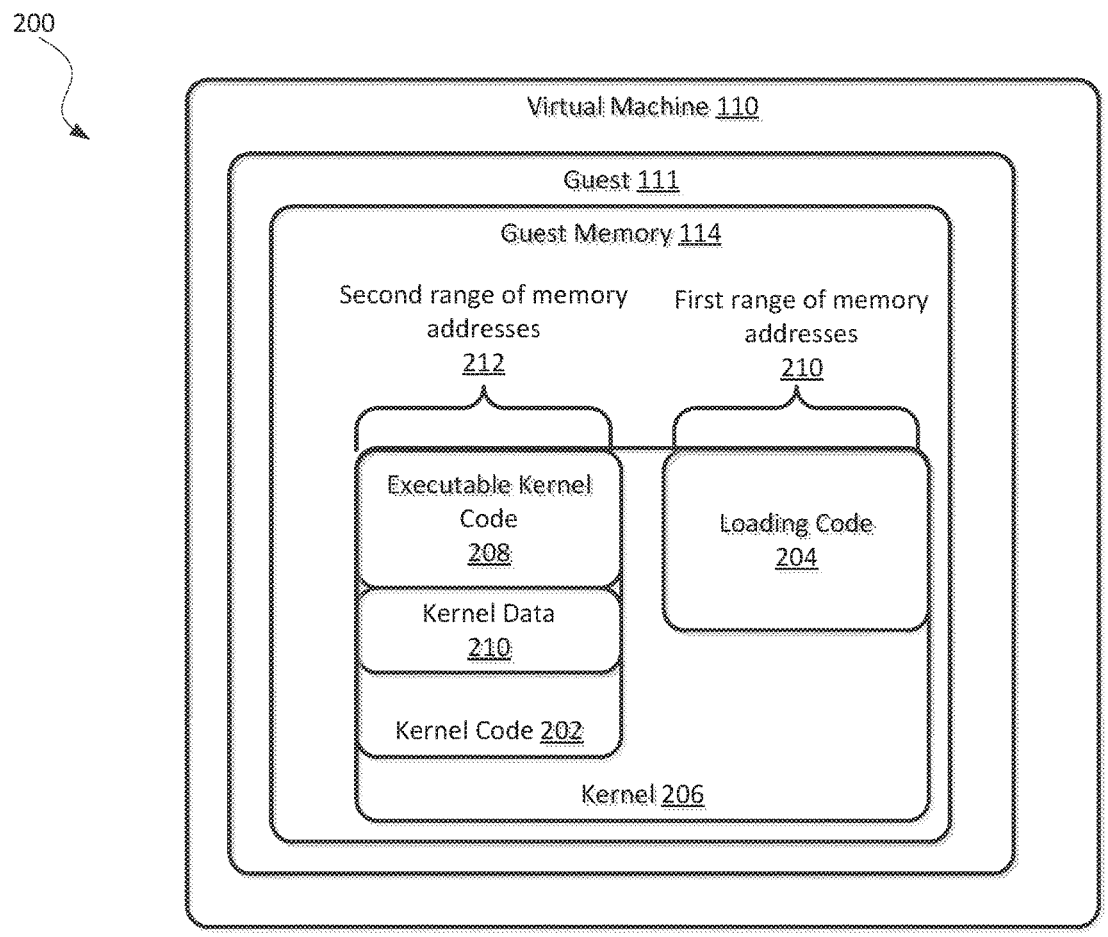
FIG. 2 is an example block diagram illustrating a system for securing the modification of one or more guest memory permissions.

In some examples, it may be desirable to modify one or more guest memory permissions stored in a hypervisor page table in a secure fashion. FIG. 2 is an example block diagram 200 illustrating a system for securing the modification of one or more guest memory permissions. Although the description below may describe memory pages as being guest memory pages, it should be understood that the memory pages may be host memory pages or hypervisor memory pages. Additionally, although modification of guest memory permissions may be discussed in relation to the examples, it should be understood that modification of a guest memory page is also within the scope of the disclosure.

In the example illustrated in FIG. 2, guest 111 runs on virtual machine 110 and includes guest memory 114. Guest memory 114 includes a kernel 206 that serves as an intermediary between hardware and software (e.g., an application running on guest 111). Kernel 206 includes kernel code 202, which includes executable kernel code 208 and kernel data 210, and loading code 204. Loading code 204 may be granted special permissions to modify guest memory permissions, while other code is denied such access. Additionally, loading code 204 may be granted special permissions to modify guest memory pages, while other code is denied such access. In some examples, executable kernel code 208, kernel data 210, and/or a set of guest page tables (not shown) are write-protected. For added security, loading code 204 may also be write-protected so that it cannot be modified.

In the example illustrated in FIG. 2, loading code 204 is stored at a first range of memory addresses 210 in guest memory 114, and kernel code 202 is stored at a second range of memory addresses 212 in guest memory 114. First set of hypervisor page tables 116-1 and second set of hypervisor page tables 116-2 may be mutually exclusive and stored in separate memory regions from each other. Loading code 204 may be kept separate from kernel code 202 so that if kernel code 202 is compromised, it will still be difficult for the attacker to modify guest 111's memory permissions using loading code 204. In an example, loading code 204 is marked with a special compiler or linker attribute, and is placed in a separate text modifying section in the kernel executable. Guest 111 may be partitioned such that a portion of guest memory 114 may modify the access permissions to a second portion of guest memory 114 (e.g., kernel code 202) if that portion of guest memory 114 is loading code 204.

Referring back to FIG. 1, in some examples, at most one of first set of hypervisor page tables 116-1 and second set of hypervisor page tables 116-2 is active at any one time for each guest virtual processor. Hypervisor 108 may allow guest 111 to switch between first set of hypervisor page tables 116-1 and second set of hypervisor page tables 116-2. Each guest virtual processor is restricted by the access permissions specified in the active hypervisor page table. In an example, guest 111 performs operations on memory pages based on the permission bits in the active hypervisor page table. In keeping with the above examples, after control is transferred to loading code 204, first set of hypervisor page tables 116-1 is active. Additionally, after control is transferred to kernel code 202, second set of hypervisor page tables 116-2 is active. In some examples, guest 111 is unaware that hypervisor 108 is maintaining two different sets of hypervisor page tables.

Figure 3:
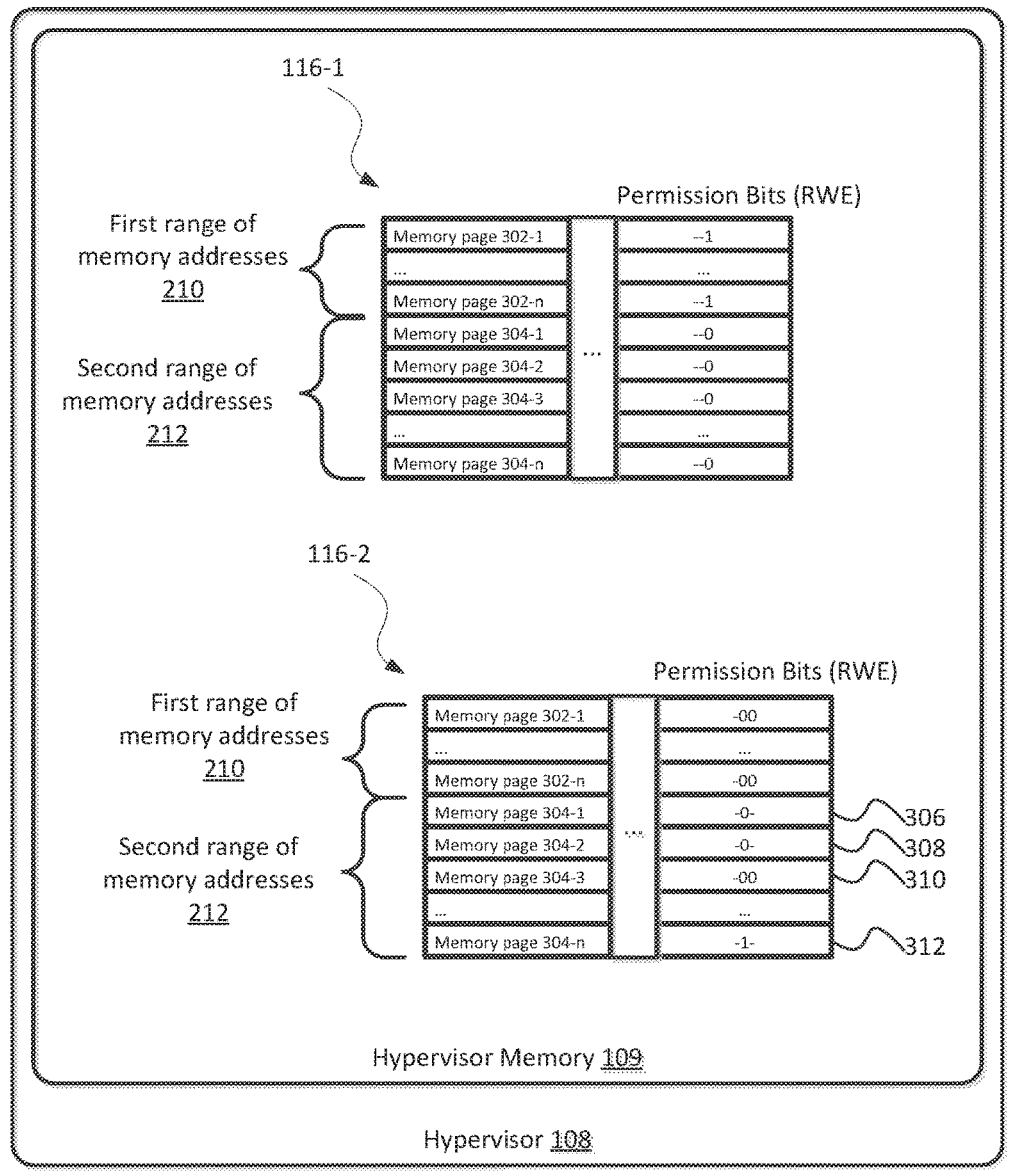
FIG. 3 is an example of a first set of hypervisor page tables and a second set of hypervisor page tables.

FIG. 3 is an example of first set of hypervisor page tables 116-1 and second set of hypervisor page tables 116-2. In FIG. 3, memory pages 302-1, . . . , and 302-n correspond to first range of memory addresses 210, which stores loading code 204, and memory pages 304-1, 304-2, 304-3, . . . , and 304-n correspond to second range of memory addresses 212, which stores kernel code 202. Additionally, a page table entry includes a memory page location along with its access permissions. The access permission bits may be in a read, write, and execute (RWE) order. A "1" bit value may indicate that the corresponding permission is allowed, a "0" bit value may indicate that the corresponding permission is prohibited, and "–" may indicate that the corresponding permission does not matter. It should be understood, however, that in other examples, the "0" bit value may indicate that the corresponding permission is allowed, and the "1" bit value may indicate that the corresponding permission is prohibited.

Referring to FIG. 3, hypervisor 108 may set memory pages 302-1, . . . , and 302-n to the readable, writable, and executable mode, and memory pages 304-1, 304-2, 304-3, . . . , and 304-n to the readable, writable, and non-executable mode in first set of hypervisor page tables 116-1. In some examples, hypervisor 108 sets memory pages 302-1, . . . , and 302-n to the readable, write-protected, and executable mode in first set of hypervisor page tables 116-1. Additionally, hypervisor 108 may set memory pages 302-1, . . . , and 302-n to the readable, non-writable, and non-executable mode, and memory pages 304-1, 304-2, 304-3, . . . , and 304-n to their appropriate mode(s) in second set of hypervisor page tables 116-2. For example, hypervisor 108 may set memory pages 304-1 and 304-2 to the write-protected mode as shown in entries 306 and 308, memory page 304-3 to the write-protected and non-executable mode as shown in entry 310, and memory page 304-n to the writable mode as shown in entry 312 in second set of hypervisor page tables 116-2.

If first set of hypervisor page tables 116-1 is active, then loading code 204 is executable, but kernel code 202 is not executable. If hypervisor 108 switches control from first set of hypervisor page tables 116-1 to second set of hypervisor page tables 116-2, then second set of hypervisor page tables 116-2 becomes active and loading code 204 is not executable code. If hypervisor 108 switches control from second set of hypervisor page tables 116-2 to first set of hypervisor page tables 116-1, then first set of hypervisor page tables 116-1 becomes active and thus loading code 204 is executable.

Loading code 204 may cause guest 111's memory permission in second set of hypervisor page tables 116-2 to be modified by sending a request to hypervisor 108 to modify the appropriate memory permission in second set of hypervisor page tables 116-2. Hypervisor 108 may determine whether the request was sent from loading code 204. If the request is sent by an entity other than loading code 204, hypervisor 108 may deny the request. For example, in response to a determination that the request was not sent from loading code 204, hypervisor 108 denies the request. In this example, hypervisor 108 does not modify guest 111's memory permission in second set of hypervisor page tables 116-2 in accordance with the request.

Hypervisor 108 may confirm that loading code 204 sent the request to modify the guest's memory permission by determining whether first set of hypervisor page tables 116-1 is active. If first set of hypervisor page tables 116-1 is active, loading code 204 is executable and capable of sending the request, and no other code is executable. Loading code 204 may send the request to hypervisor 108 if first set of hypervisor page tables 116-1 is active. If hypervisor 108 confirms that loading code 204 sent the request to modify the guest's memory permission, hypervisor 108 may modify the guest's memory permission accordingly in second set of hypervisor page tables 116-2. After the appropriate guest memory permission(s) is/are modified, hypervisor 108 may then switch control back to second set of hypervisor page tables 116-2 so that it is active. In this example, second set of hypervisor page tables 116-2 stores the updated memory permissions of the guest. Accordingly, permissions that the guest did not have before hypervisor 108 changed the guest's memory permissions in accordance with the request may be allowed after hypervisor 108 switches control back to second set of hypervisor page tables 116-2.

In an example, hypervisor 108 maintains a page table pointer that points to the active hypervisor page table. If hypervisor 108's page table pointer points to first set of hypervisor page tables 116-1, then first set of hypervisor page tables 116-1 is active. Similarly, if hypervisor 108's page table pointer points to second set of hypervisor page tables 116-2, then second set of hypervisor page tables 116-2 is active. Hypervisor 108 may modify its page table pointer to switch from pointing to first set of hypervisor page tables 116-1 to second set of hypervisor page tables 116-2, and vice versa.

Figure 4A:
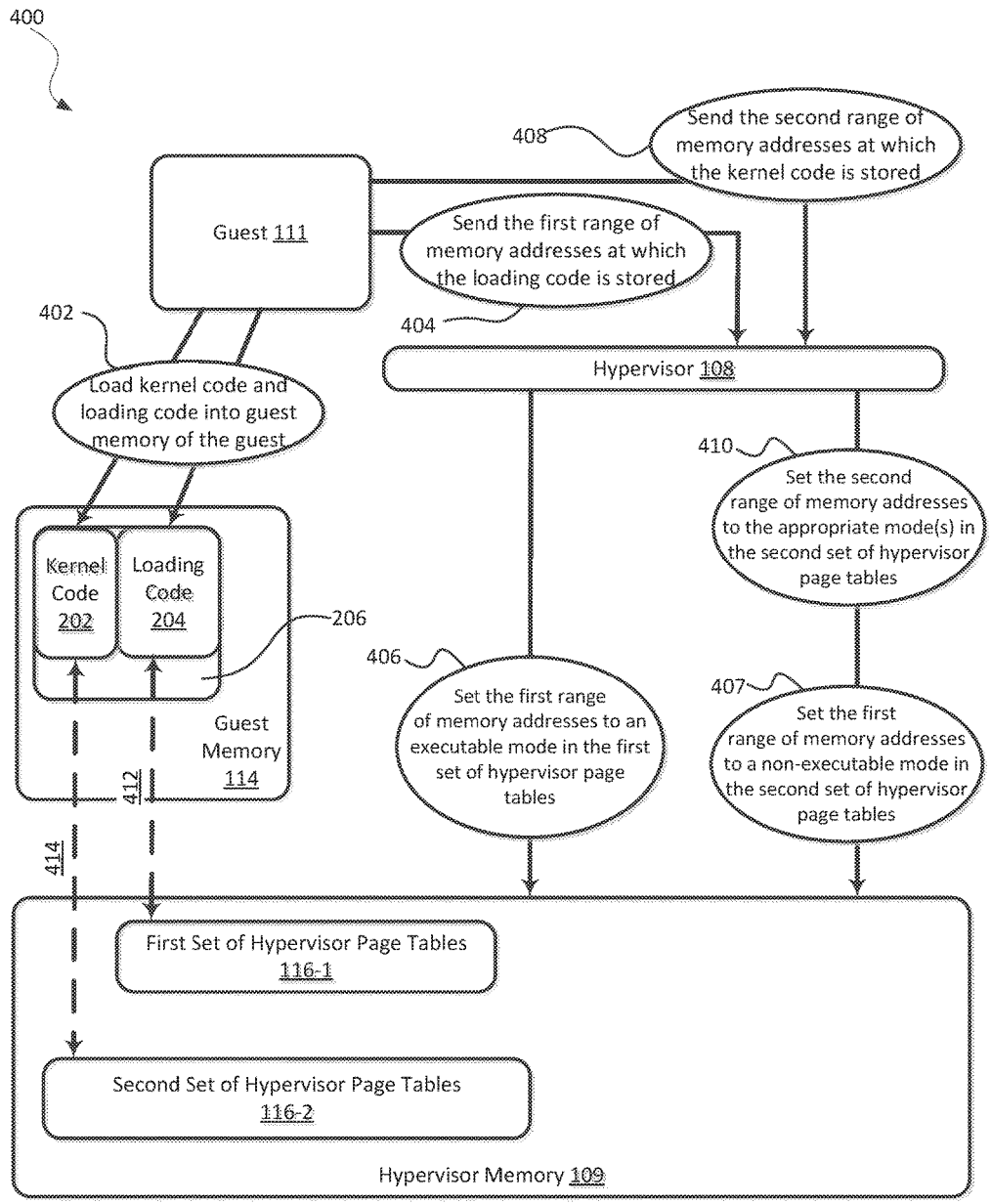
FIGS. 4A-4C are example process flows illustrating the modification of one or more guest memory permissions.
Figure 4B:
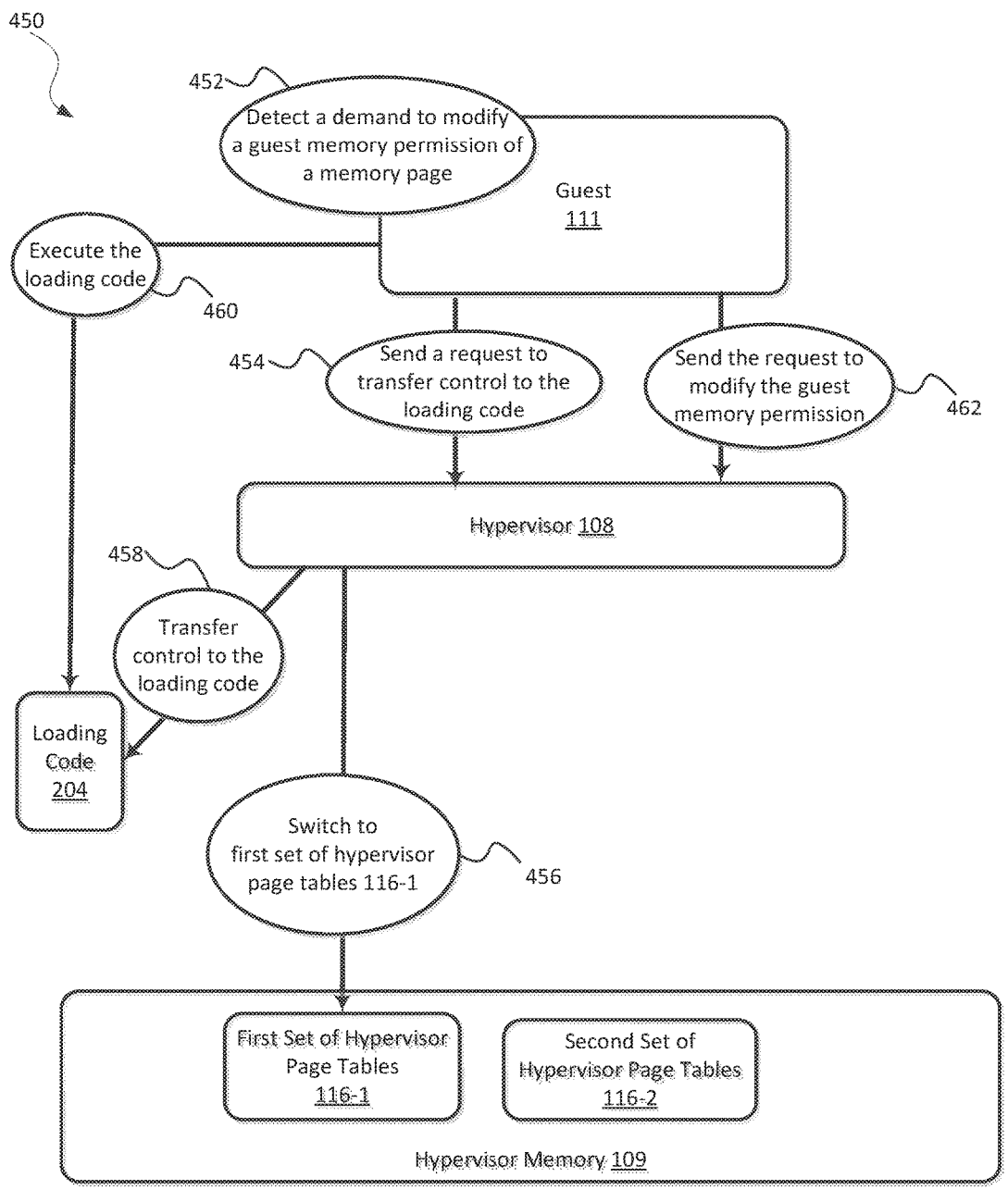
Figure 4C:
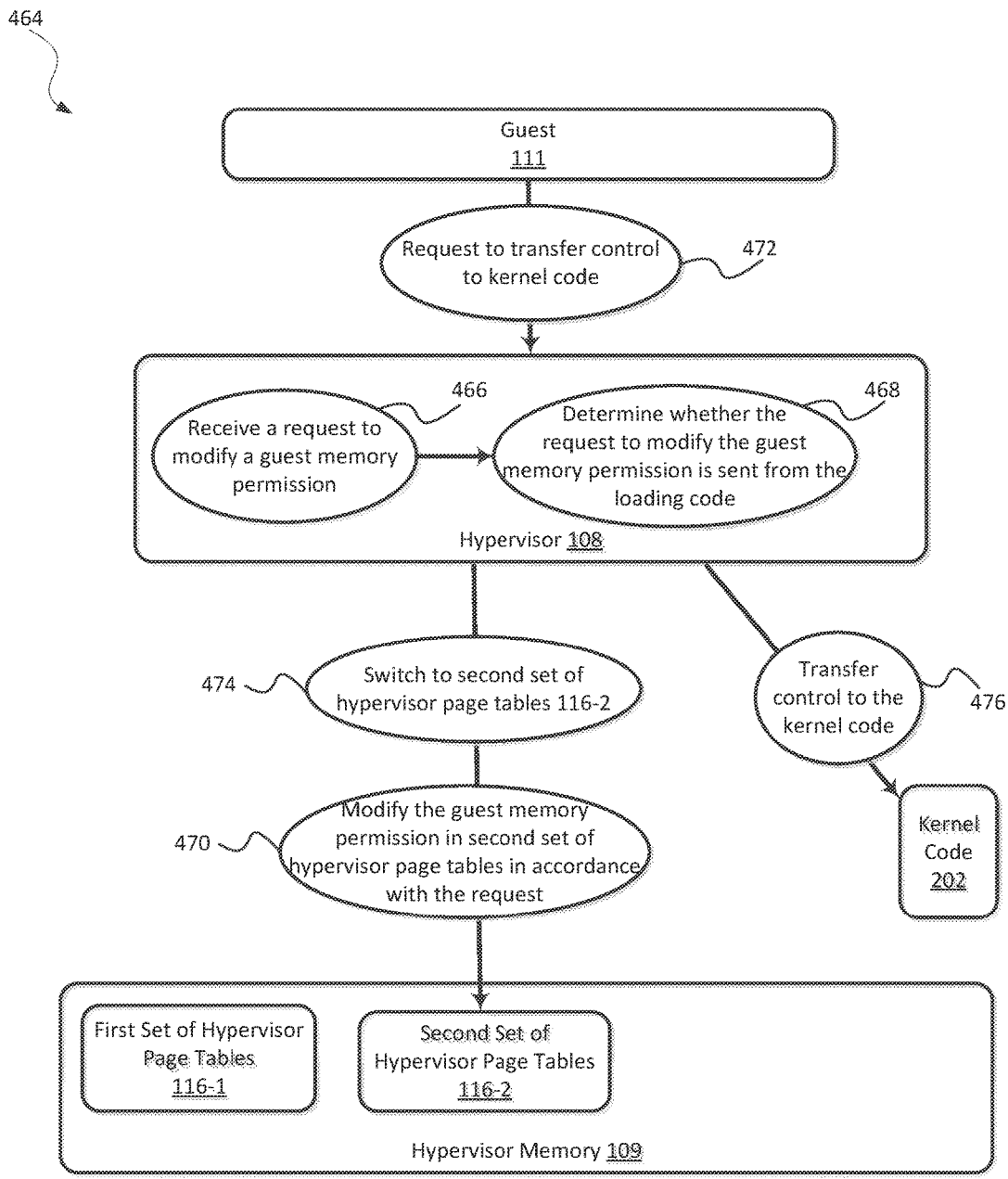

FIGS. 4A-4C are example process flows 400, 450, 464 illustrating the modification of one or more guest memory permissions in second set of hypervisor page tables 116-2 by loading code 204. In FIG. 4A, at an action 402, guest 111 loads kernel code 202 and loading code 204 into guest memory 114 of guest 111. Referring back to FIG. 2, loading code 204 is stored at first range of memory addresses 210, and kernel code 202 is stored at second range of memory addresses 212. It should be understood that guest 111 may first load kernel code 202 and then load loading code 204 into guest memory 114, may first load loading code 204 and then kernel code 202 into guest memory 114, or may interleave the loading of kernel code 202 and loading code 204 (e.g., loading at least a portion of kernel code 202 and cease loading kernel code 202, then loading at least a portion of loading code 204 and cease loading code 204, etc.). In an example, guest 111 loads loading code 204 into a separate page-aligned memory region. Loading code 204 may be page aligned to a specific page size.

At an action 404, guest 111 sends first range of memory addresses 210, which stores loading code 204, to hypervisor 108. In an example, guest 111 sends a message indicating that first range of memory addresses 210 is associated with first set of hypervisor page tables 116-1 to hypervisor 108. Loading code 204 is code within guest 111 that has access to guest memory 114 and is able to modify the guest 111's memory permissions specified in second set of hypervisor page tables 116-2 (see FIG. 3) by sending a request to hypervisor 108 to do so. In an example, loading code 204 is provided with extra privileges for modifying guest 111's memory permissions set in second set of hypervisor page tables 116-2. Hypervisor 108 may receive and/or identify first range of memory addresses 210 and determine that it (or loading code 204) is associated with first set of hypervisor page tables 116-1.

At an action 406, hypervisor 108 sets first range of memory addresses 210, which stores loading code 204, to the executable mode in first set of hypervisor page tables 116-1 (see FIG. 3). Accordingly, a portion of kernel 206 (e.g., loading code 204) is capable of being executed while first set of hypervisor page tables 116-1 is active. In some examples, the permissions set at action 406 are non-modifiable and cannot be changed. Hypervisor 108 may set first range of memory addresses 210 to the executable mode by updating the permission bits for one or more memory pages within first range of memory addresses 210 to "--1" in first set of hypervisor page tables 116-1. Hypervisor 108 may perform this action for each memory page within first range of memory addresses 210 until all memory pages within this first address range are set to the executable mode. Accordingly, a memory page having the executable mode may have its corresponding page table entry store the permission bits "--1." In some examples, any memory addresses outside first range of memory addresses 210 in first set of hypervisor page tables 116-1 are set to the non-executable mode. In some examples, hypervisor 108 sets first range of memory addresses 210 to the write-protected and executable mode in first set of hypervisor page tables 116-1. In such an example, loading code 204 is not modifiable if first set of hypervisor page tables 116-1 is active.

At an action 407, hypervisor 108 sets first range of memory addresses 210 to a non-executable mode in second set of hypervisor page tables 116-2. Accordingly, loading code 204 is not executable while second set of hypervisor page tables 116-2 is active. In some examples, the permissions set at action 407 are non-modifiable and cannot be changed. Hypervisor 108 may set first range of memory addresses 210 to this non-executable mode by updating the permission bits for one or more memory pages within first range of memory addresses 210 to "--0" in second set of hypervisor page tables 116-2. Hypervisor 108 may perform this action for each memory page within first range of memory addresses 210 until all memory pages within this first address range are set to the non-executable mode in second set of hypervisor page tables 116-2. Accordingly, a memory page having the non-executable mode may have its corresponding page table entry store the permission bits "--0." In some examples, hypervisor 108 also sets first range of memory addresses 210 to the write-protected mode so that loading code 204 is not modifiable while second set of hypervisor page tables 116-2 is active (see FIG. 3).

At an action 408, guest 111 sends second range of memory addresses 212, which stores kernel code 202, to hypervisor 108. In an example, guest 111 sends a message indicating that second range of memory addresses 212 is associated with second set of hypervisor page tables 116-2 to hypervisor 108. Kernel code 202 is code within guest 111 and includes executable kernel code 208 and kernel data 210. Hypervisor 108 may receive and/or identify second range of memory addresses 212 and determine that it (or kernel code 202) is associated with second set of hypervisor page tables 116-2. Hypervisor 108 may retrieve second range of memory addresses 212, which stores kernel code 202, in a variety of ways. In an example, guest 111 sends second range of memory addresses 212 to hypervisor 108 and specifies that second range of memory addresses 212 is associated with second set of hypervisor page tables 116-2. Guest 111 may send second range of memory addresses 212 in the same or different communication in which guest 111 sends first range of memory addresses 210 to hypervisor 108. In another example, MMU 118 provides hypervisor 108 with the second range of memory addresses 212 storing kernel code 202.

In some examples, action 408 is not performed. For example, hypervisor 108 may associate all guest memory that is not associated with first set of hypervisor page tables 116-1 (e.g., loading code 204) with second set of hypervisor page tables 116-2 (e.g., kernel code 202), and thus it may be unnecessary for guest 111 to send second range of memory addresses 212 to hypervisor 108. Hypervisor 108 may identify all pages outside the range of first range of memory addresses 210 in the virtual address space assigned to guest 111 as being within second range of memory addresses 212.

A dashed-line 412 indicates that loading code 204 corresponds to first set of hypervisor page tables 116-1. Additionally, a dashed-line 414 indicates that kernel code 202 corresponds to second set of hypervisor page tables 116-2, which stores one or more hypervisor page tables storing permissions for guest 111's access to memory pages within kernel code 202. While kernel code 202 executes, second set of hypervisor page tables 116-2 is active. In contrast, while loading code 204 executes, first set of hypervisor page tables 116-1 is active. Loading code 204 may request hypervisor 108 to modify the guest's memory permissions specified in second set of hypervisor page tables 116-2 in order to grant guest 111 read, write, and/or execute permission to a memory page that was previously not allowed.

At an action 410, hypervisor 108 sets the second range of memory addresses 212, which stores kernel code 202, to the appropriate modes in second set of hypervisor page tables 116-2. For example, hypervisor 108 may set memory pages 304-1 and 304-2 to the write-protected mode by updating the permissions bits in entries 306 and 308 to "–0–," hypervisor 108 may set memory page 304-3 to the write-protected and non-executable mode by updating the permissions bits in entry 310 to "–00," and hypervisor 108 may set memory page 304-n to the writable mode by updating the permissions bits in entry 312 to "–1–".

At a later point in time, guest 111 may desire to modify its memory access permissions for one or more memory pages within second range of memory addresses 212. In an example, the particular memory page may store executable code of the kernel or one or more guest page tables. In order to modify its memory access permissions, guest 111 requests hypervisor 108 to transfer control to loading code 204 because hypervisor 108 approves requests to modify guest memory permissions from loading code 204 and no other entities. After control is transferred to loading code 204, first set of hypervisor page tables 116-1 is active, and thus loading code 204 is executable.

Kernel code 202 may have control of virtual processor 112-1. While kernel code 202 has control of virtual processor 112-1, second set of hypervisor page tables 116-2 is active. In FIG. 4B, at an action 452, guest 111 detects a demand to modify a guest memory permission of a memory page. In an example, guest 111 detects a demand to modify guest 111's access to memory page 304-3, which is associated with entry 310. In such an example, the demand may be to modify guest 111's access permissions such that the content stored at memory page 304-3 is executable by guest 111 and is set to such a permission in second set of hypervisor page tables 116-2.

At an action 454, in response to detecting the demand to modify the guest memory permission, guest 111 sends a request to hypervisor 108 to transfer control to loading code 204. Guest 111 may send the request to hypervisor 108 to transfer control to loading code 204 by invoking a hypercall or other privileged instruction that requests hypervisor 108 to transfer control to loading code 204. In an example, sending the request to hypervisor 108 to transfer control to loading code 204 may include guest 111 executing a command that causes virtual machine 110 to exit and control to be transferred to hypervisor 108. A VM exit marks the point at which a transition is made between the virtual machine currently running and hypervisor 108. Accordingly, in response to guest 111's request to transfer control to loading code 204, control may be transferred to hypervisor 108, which then transfers control to loading code 204.

At an action 456, in response to guest 111's request to transfer control to loading code 204, hypervisor 108 switches the active hypervisor page tables from second set of hypervisor page tables 116-2 to first set of hypervisor page tables 116-1, which enables loading code 204 to execute. First set of hypervisor page tables 116-1 corresponds to loading code 204. In some examples, hypervisor 108 maintains a page table pointer that points to the active hypervisor page table. In an example, in response to detecting a request to transfer control to loading code 204, hypervisor 108 modifies the page table pointer to point to first set of hypervisor page tables 116-1. In contrast, in response to detecting a request to transfer control to kernel code 202, hypervisor 108 modifies the page table pointer to point to second set of hypervisor page tables 116-2.

At an action 458, in response to guest 111's request to transfer control to loading code 204, hypervisor 108 transfers control to loading code 204. In some examples, hypervisor 108 transfers control from kernel code 202 to loading code 204 in response to detecting the request to transfer control from kernel code 202 to loading code 204. Hypervisor 108 may transfer control to loading code 204 by modifying an instruction pointer to point to the loading code. Hypervisor 108 may then transfer control to loading code 204 by executing a VM entry command that causes virtual machine 110 to re-enter and control to be transferred to guest 111. At this point, the guest 111 re-enters and may proceed with executing the next instructions, which would be loading code 204.

At an action 460, guest 111 executes loading code 204. In this way, hypervisor 108 may cause guest 111 to execute loading code 204. In an example, in response to detecting the request to transfer control to loading code 204, hypervisor 108 switches a particular virtual processor and causes it to start executing loading code 204. Loading code 204 may include various instructions. In an example, loading code 204 includes instructions to identify the demand to modify the particular guest memory page permission. Loading code 204 and kernel code 202 may share a channel (e.g., shared a memory region), and loading code 204 may detect via the channel that the kernel is requesting modification to the guest's memory page permissions or has detected a demand to modify the guest's memory permissions.

Loading code 204 may include instructions to determine whether the request (or demand) to modify the guest's memory permissions in second set of hypervisor page tables 116-2 is valid. The request may be a request to modify a permission bit in a page table entry (e.g., a page table entry in a guest page table). In an example, loading code 204 may determine whether page table entry 310 in accordance with the modification follows an expected format. In response to a determination that the modification follows the expected format, loading code 204 may forward the request to hypervisor 108 to perform the requested modification on behalf of the guest. In keeping with the above example, loading code 204 may request hypervisor 108 to set memory page 304-3 to the executable mode in second set of hypervisor page tables 116-2. In response to a determination that the requested modification does not follow the expected format, loading code 204 may discard the request and send an error message. In another example, loading code 204 obtains a signature and verifies the obtained signature with a signature of the applicable memory page content to determine whether they match. The applicable memory page content refers to the content stored at the memory page(s) (e.g., memory page 304-3 in this example) for which permissions are requested to be modified. In another example, loading code 204 verifies that the content stored at the applicable memory pages is valid and safe. For example, loading code 204 may compare the content stored at the applicable memory pages against data content that is known for being a virus or malicious code.

At an action 462, in response to a determination that the request is valid, loading code 204 sends the request to modify the guest's memory permissions to hypervisor 108. In some examples, loading code 204 sends hypervisor 108 the request to modify guest 111's access permissions to write-protected memory and may be used to load, modify, or execute code on behalf of the rest of the guest. In an example, loading code 204 loads code text into kernel 206, sets the loaded code text to the write-protected mode in second set of hypervisor page tables 116-2, validates this loaded code text, verifies its signature, and then sets it to the executable mode in second set of hypervisor page tables 116-2. Although loading code 204 is shown as being part of kernel 206, it should also be understood that loading code 204 may be separate from kernel 206. In contrast, in response to a determination that the request is not valid, loading code 204 sends an error message and/or discards the request.

In FIG. 4C, at an action 466, hypervisor 108 receives a request to modify guest 111's memory permission set in second set of hypervisor page tables 116-2. At an action 468, hypervisor 108 determines whether the request to modify the guest memory permission is sent from loading code 204. To determine whether the request to modify the guest memory permission is sent from loading code 204, hypervisor 108 may determine which set of hypervisor page tables is active. In response to a determination that first set of hypervisor page tables 116-1 is active, hypervisor 108 may determine that loading code 204 sent the request. In response to a determination that first set of hypervisor page tables 116-1 is not active, hypervisor 108 may determine that the request was not sent from loading code 204. In this example, the request to modify the guest memory permission is sent by an entity different from loading code 204. At an action 470, in response to a determination that loading code 204 sent the request, hypervisor 108 modifies the guest memory permission in the second set of hypervisor page tables 116-2 in accordance with the request. For example, hypervisor 108 may set the permission bits in entry 310 to "-01" so that memory page 304-3 is executable by guest 111 when second set of hypervisor page tables 116-2 is active.

Loading code 204 includes instructions to send a request to hypervisor 108 to transfer control to kernel code 202 after the appropriate page table entry (e.g., page table entry 310 in second set of hypervisor page tables 116-2) has been modified. At an action 472, guest 111 sends a request to hypervisor 108 to transfer control to kernel code 202. Guest 111 may send the request to hypervisor 108 to transfer control to kernel code 202 by invoking a hypercall or other privileged instruction that requests hypervisor 108 to transfer control to kernel code 202. Sending the request to hypervisor 108 to transfer control to kernel code 202 may include guest 111 executing a command that causes virtual machine 110 to exit and control to be transferred to hypervisor 108. Accordingly, in response to guest 111's request to transfer control to kernel code 202, control may be transferred to hypervisor 108.

At an action 474, in response to guest 111's request to transfer control to kernel code 202, hypervisor 108 switches the active hypervisor page tables from first set of hypervisor page tables 116-1 to second set of hypervisor page tables 116-2, which corresponds to kernel code 202. At an action 476, in response to guest 111's request to transfer control to kernel code 202, hypervisor 108 transfers control to kernel code 202. Hypervisor 108 may transfer control to kernel code 202 by modifying an instruction pointer to point to the kernel code. Hypervisor 108 may then transfer control to virtual machine 110 by executing a VM entry command that causes virtual machine 110 to re-enter and control to be transferred to guest 111. At this point, the guest 111 re-enters and may proceed with executing the next instructions. Guest 111 may then proceed with executing kernel code 202.

In some examples, first set of hypervisor page tables 116-1 and second set of hypervisor page tables 116-2 are selected per processor. In this way, each hypervisor page table of first set of hypervisor page tables 116-1 and second set of hypervisor page tables 116-2 may be used by any number of processors. Other virtual processors included in the same virtual machine may still be able to use second set of hypervisor page tables 116-2. In an example, first set of hypervisor page tables 116-1 and second set of hypervisor page tables 116-2 are created and the appropriate modes are set in these hypervisor page tables in response to guest 111 sending hypervisor 108 a message indicating that first range of memory addresses 210 at which loading code 204 is stored is associated with first set of hypervisor page tables 116-1 and further indicating that second range of memory addresses 212 at which kernel code 202 is stored is associated with second set of hypervisor page tables 116-2. In another example, first set of hypervisor page tables 116-1 and second set of hypervisor page tables 116-2 are created and the appropriate modes are set in these hypervisor page tables in response to guest 111 detecting a demand to modify set of memory pages 124.

In another example, hypervisor 108 creates and destroys first set of hypervisor page tables 116-1 and second set of hypervisor page tables 116-2 dynamically. For example, hypervisor 108 may detect a request to modify one or more guest memory permissions. Hypervisor 108 may detect the request to modify the guest memory permission by detecting a host page fault. Hypervisor 108 may determine whether the request is from loading code 204. In response to a determination that the request to modify the guest memory permission is from loading code 204, hypervisor 108 creates first set of hypervisor page tables 116-1 and/or second set of hypervisor page tables 116-2 and sets the appropriate modes in these hypervisor page tables. In response to a determination that the request to modify the guest memory permission(s) is not from loading code 204, hypervisor 108 may deny the request.

As discussed above and further emphasized here, FIGS. 1-3 and 4A-4C are merely examples, which should not unduly limit the scope of the claims. For example, although in the above examples, hypervisor 108 switches between first set of hypervisor page tables 116-1 and second set of hypervisor page tables 116-2, it should be understood that this is not intended to be limiting. For example, hypervisor memory 109 may include more than two hypervisor page tables that store different memory page access permissions. Additionally, one or more hardware processors may perform this functionality and include instructions to switch between first set of hypervisor page tables 116-1 and second set of hypervisor page tables 116-2. In an example, the instructions to switch between first set of hypervisor page tables 116-1 and second set of hypervisor page tables 116-2 may be built within these sets of page tables. In another example, the switching between first set of hypervisor page tables 116-1 and second set of hypervisor page tables 116-2 may be executed via a processor instruction such as VMFUNC.

It should also be understood that the disclosure can apply to not only the loader code and kernel code discussed in the examples, but to any code that runs within the guest. For example, the guest may include first code that is responsible for modifying the permission(s) in the hypervisor page tables and second code that includes the remaining code within the guest (the first and second code may be mutually exclusive code portions within the guest), and the first code may be associated with the first set of hypervisor page tables and the second code may be associated with the second set of hypervisor page tables. Additionally, the kernel code may run with or without supervisor privileges within the guest. Moreover, the loader code may be part of the operating system or separate from (not part of) the operating system. In an example, the loader code may be an application.

Moreover, it should be understood that various mechanisms may be employed to switch between hypervisor page tables. In an example, the hypervisor may activate this switching between hypervisor page tables. In another example, the guest may activate this switching between hypervisor page tables. For example, the guest may use a virtual machine function command to switch between hypervisor page tables.

Figure 5:
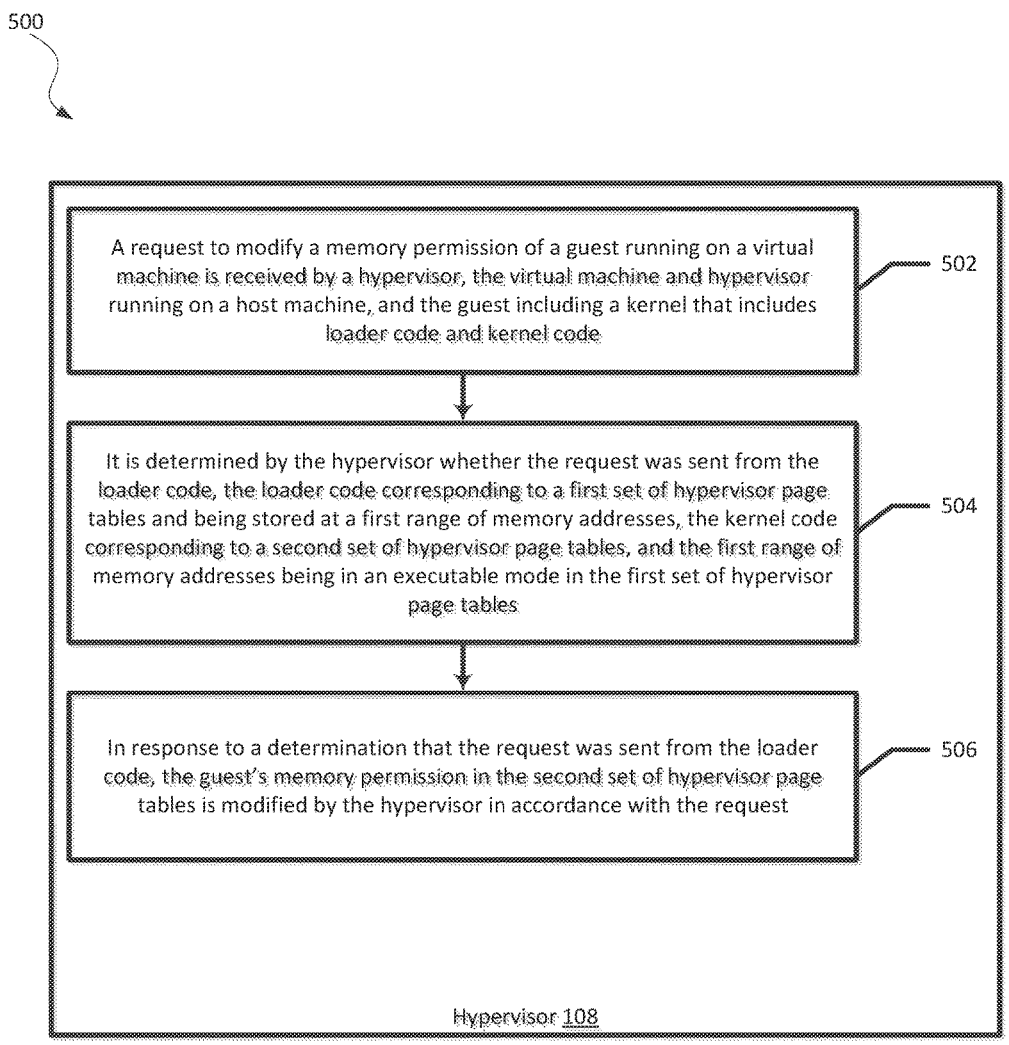
FIG. 5 is an example flowchart illustrating a method of securing the modification of one or more guest memory permissions.

FIG. 5 is an example flowchart illustrating a method 500 of modifying one or more guest memory permissions stored in a hypervisor page table. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by the system 100 illustrated in FIG. 1. For example, method 500 may be performed on host machine 102. In some examples, the order of the actions described below may also be performed according to alternative orderings. In yet other examples, additional actions may be added and actions that are described may be removed.

Method 500 includes blocks 502, 504, and 506. In a block 502, a request to modify a memory permission of a guest running on a virtual machine is received by a hypervisor, the virtual machine and hypervisor running on a host machine, and the guest including a kernel that includes loading code and kernel code. In an example, hypervisor 108 receives a request to modify a memory permission of guest 111 running on virtual machine 110, virtual machine 110 and hypervisor 108 running on host machine 102, and guest 111 including a kernel 206 that includes loading code 206 and kernel code 202. For example, the request may be a request to modify guest 111's permissions to memory page 304-3 in page table entry 310 such that the memory page is executable by guest 111.

In a block 504, it is determined by the hypervisor whether the request was sent from the loading code, the loading code corresponding to a first set of hypervisor page tables and being stored at a first range of memory addresses, the kernel code corresponding to a second set of hypervisor page tables, and the first range of memory addresses being in an executable mode in the first set of hypervisor page tables. In an example, hypervisor 108 determines whether the request was sent from loading code 204, loading code 204 corresponding to first set of hypervisor page tables 116-1 and being stored at first range of memory addresses 210, kernel code 202 corresponding to second set of hypervisor page tables 116-2, and first range of memory addresses 210 being in an executable mode in first set of hypervisor page tables 116-1.

In a block 506, in response to a determination that the request was sent from the loading code, the guest's memory permission in the second set of hypervisor page tables is modified by the hypervisor in accordance with the request. In an example, in response to a determination that the request was sent from loading code 204, hypervisor 108 modifies guest 111's memory permission in second set of hypervisor page tables 116-2 in accordance with the request. In an example, hypervisor 108 modifies page table entry 310 such that it stores the permission bits "–01" and memory page 304-3 thus becomes executable when second set of hypervisor page tables 116-2 is active.

It is also understood that additional processes may be performed before, during, or after blocks 502, 504, and 506 discussed above. Although the above examples describe one guest memory permission in second set of hypervisor page tables 116-2 being modified, it should be understood that more than one guest memory permission in second set of hypervisor page tables 116-2 may be modified. Further, although loading code 204 has been described as sending a request to hypervisor 108 to update one or more guest memory permissions, it should also be understood that loading code 204 may send a request to hypervisor 108 to modify a memory page of guest 111. In this example, hypervisor 108 may modify the guest memory page based on whether the request was sent from loading code 204.

Figure 6:
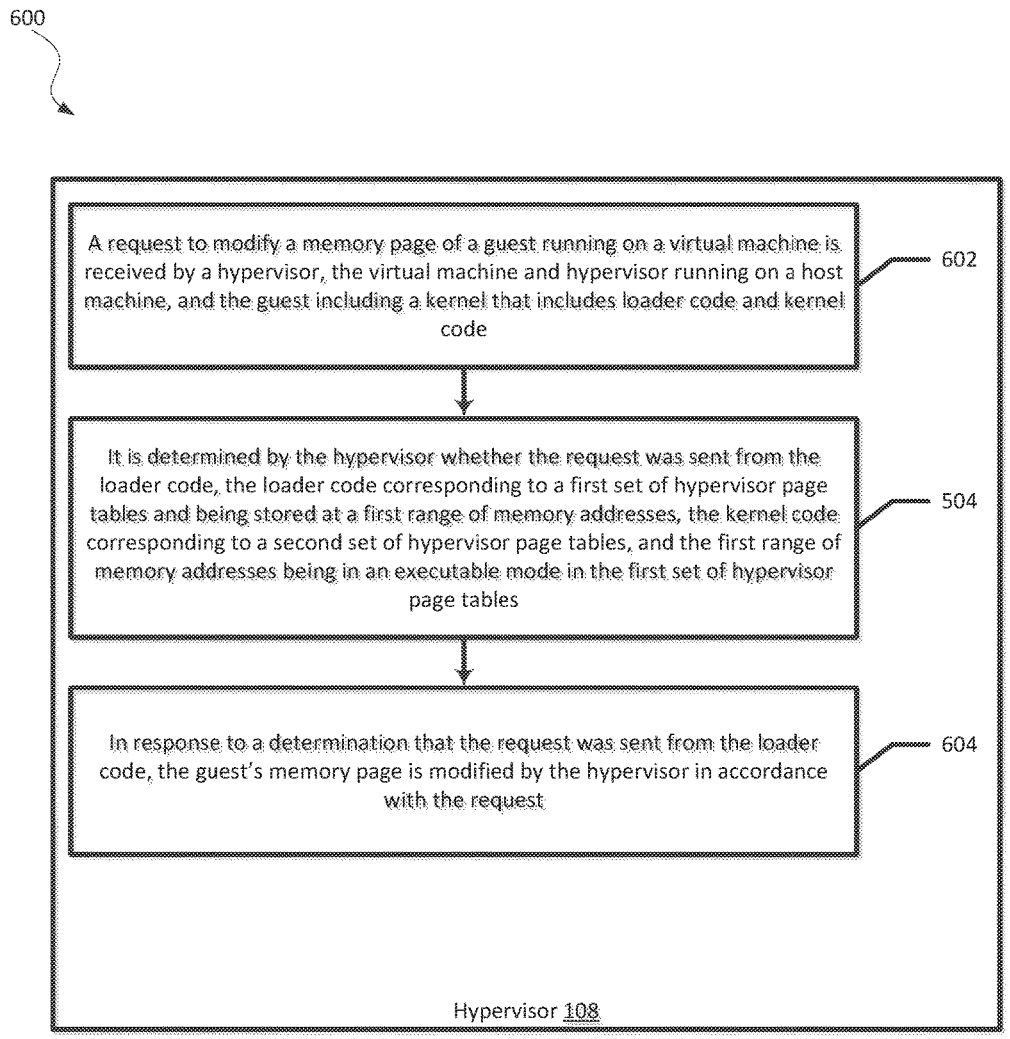
FIG. 6 is an example flowchart illustrating another method of securing the modification of one or more guest memory permissions.

FIG. 6 is an example flowchart illustrating a method 600 of modifying one or more guest memory pages. Method 600 is not meant to be limiting and may be used in other applications. Method 600 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 600 is performed by the system 100 illustrated in FIG. 1. For example, method 600 may be performed on host machine 102. In some examples, the order of the actions described below may also be performed according to alternative orderings. In yet other examples, additional actions may be added and actions that are described may be removed.

Method 600 includes blocks 602, 504, and 604. In a block 602, a request to modify a memory page of a guest running on a virtual machine is received by a hypervisor, the virtual machine and hypervisor running on a host machine, and the guest including a kernel that includes loading code and kernel code. In an example, hypervisor 108 receives a request to modify memory page 304-3 of guest 111 running on virtual machine 110, virtual machine 110 and hypervisor 108 running on host machine 102, and guest 111 including a kernel 206 that includes loading code 206 and kernel code 202. Process flow proceeds from block 602 to block 504, and then to block 604. In block 604, in response to a determination that the request was sent from the loading code, the guest's memory page is modified by the hypervisor in accordance with the request. In an example, in response to a determination that the request was sent from loading code 204, hypervisor 108 modifies memory page 304-3 of guest 111 in accordance with the request. For example, hypervisor 108 may write data to memory page 304-3 on behalf of the guest. It is also understood that additional processes may be performed before, during, or after blocks 602, 504, and 604 discussed above.

In various implementations, host machine 102 may be a client or a server computing device. The client or server computing device may include one or more processors 104. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Host machine 102 may include a bus or other communication mechanism for communicating information data, signals, and information between various components of the computer system. The components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An audio I/O component may also be included to allow a user to use voice for inputting information by converting audio signals into information signals. Audio I/O component may allow the user to hear audio.

A transceiver or network interface may transmit and receive signals between host machine 102 and other devices via a communications link to a network. In an example, the transmission is wireless, although other transmission mediums and methods may also be suitable. Processor 104, which may be a micro-controller, digital signal processor (DSP), or other processing component, processes these various signals, such as for display on host machine 102 or transmission to other devices via the communications link. Processor 104 may also control transmission of information, such as cookies or IP addresses, to other devices.

Components of host machine 102 may also include a system memory component (e.g., RAM), a static storage component (e.g., ROM), and/or a disk drive. Host machine 102 performs specific operations by processor 104 and other components by executing one or more sequences of instructions contained in the system memory component (e.g., memory 106). Logic may be encoded in a computer readable medium, which may refer to any medium that participates in providing instructions to processor 104 for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., process flows 400, 450, 464, method 500, and/or method 600) to practice the present disclosure may be performed by host machine 102. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, blocks, or actions, and/or separated into sub-steps, sub-blocks, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of modifying one or more guest memory permissions stored in a hypervisor page table, comprising:
   receiving, by a hypervisor, a request to modify a memory permission of a guest running on a virtual machine, the virtual machine and hypervisor running on a host machine, and the guest including a kernel that includes loading code and kernel code;
   determining, by the hypervisor, whether the request was sent from the loading code, the loading code corresponding to a first set of hypervisor page tables and being stored at a first range of memory addresses, the kernel code corresponding to a second set of hypervisor page tables, and the first range of memory addresses being in an executable mode in the first set of hypervisor page tables; and in response to a determination that the request was sent from the loading code, modifying, by the hypervisor, the guest's memory permission in the second set of hypervisor page tables in accordance with the request.

2. The method of claim 1, further comprising:
setting, by the hypervisor, the first range of memory addresses to the executable mode in the first set of hypervisor pages tables, the first range of memory addresses being associated with the first set of hypervisor page tables.

3. The method of claim 2, further comprising:
receiving, by the hypervisor, a message indicating that the first range of memory addresses is associated with the first set of hypervisor page tables, the message being from the guest.

4. The method of claim 1, wherein memory addresses outside the first range of memory addresses in the first set of hypervisor page tables are set to a non-executable mode.

5. The method of claim 1, further comprising:
receiving, by the hypervisor, a request from the guest to transfer control to the loading code; and
in response to the request to transfer control to the loading code, transferring, by the hypervisor, control to the loading code, wherein after control is transferred to the loading code, the first set of hypervisor page tables is active.

6. The method of claim 1, wherein determining whether the request was sent from the loading code includes determining whether the first set of hypervisor page tables is active, the method further comprising:
in response to a determination that the first set of hypervisor page tables is active, determining that the request was sent from the loading code; and
in response to a determination that the first set of hypervisor page tables is not active, determining that the request was not sent from the loading code.

7. The method of claim 1, further comprising:
in response to a determination that the request was not sent from the loading code, denying the request.

8. The method of claim 1, wherein at most one of the first set of hypervisor page tables and the second set of hypervisor page tables is active at a time, and the guest is restricted by the access permissions specified in the active hypervisor page table.

9. The method of claim 8, wherein in response to control of a virtual processor being transferred to the loading code, the first set of hypervisor page tables is active, and in response to control of a virtual processor being transferred to the kernel code, the second set of hypervisor page tables is active, and wherein the virtual processor is allocated to the guest by the hypervisor.

10. The method of claim 1, further comprising:
setting, by the hypervisor, the first range of memory addresses to a write-protected mode in the second set of hypervisor page tables.

11. A system for modifying one or more guest memory permissions stored in a hypervisor page table, comprising:
a guest memory storing loading code and kernel code, wherein the loading code is stored at a first range of memory addresses in the guest memory;
a hypervisor memory storing first and second sets of hypervisor page tables, wherein the loading code corresponds to the first set of hypervisor page tables, the kernel code corresponds to the second set of hypervisor page tables, and wherein the first range of memory addresses is in an executable mode in the first set of hypervisor page tables;
a guest that runs on a virtual machine and sends a request to modify a memory permission of the guest, wherein the guest includes a kernel that includes the loading code and kernel code; and
a hypervisor that determines whether the request to modify the memory permission of the guest was sent from the loading code, wherein in response to a determination that the request was sent from the loading code, the hypervisor modifies the guest's memory permission in the second set of hypervisor page tables in accordance with the request.

12. The system of claim 11, wherein at most one of the first set of hypervisor page tables and the second set of hypervisor page tables is active at a time, and the guest is restricted by the access permissions specified in the active hypervisor page table.

13. The system of claim 11, wherein the guest sends a request to the hypervisor to transfer control to the loading code, wherein after control is transferred to the loading code, the first set of hypervisor page tables is active.

14. The system of claim 13, wherein the loading code validates the request, and in response to a determination that the request is valid, the loading code sends the request to the hypervisor to modify the guest's memory permission in the second set of hypervisor page tables in accordance with the request.

15. The system of claim 14, wherein the loading code validates the request by verifying a digital signature of content stored at a memory page for which the guest memory permission is set.

16. The system of claim 13, wherein the guest sends the request to the hypervisor to transfer control to the loading code by invoking a virtual machine function that causes the hypervisor to transfer control to the loading code.

17. The system of claim 13, wherein the guest sends the request to the hypervisor to transfer control to the loading code by invoking a hypercall that causes the hypervisor to transfer control to the loading code.

18. The system of claim 11, wherein the loading code sends the request to modify the guest's memory permission from a first mode to a second mode in the second set of hypervisor page tables, wherein before the hypervisor modifies the guest's memory permission in accordance with the request, the guest's memory permission is set to the first mode in the second set of hypervisor page tables, and after the hypervisor modifies the guest's memory permission in accordance with the request, the guest's memory permission is set to the second mode in the second set of hypervisor page tables.

19. The system of claim 11, wherein the loading code sends a request to the hypervisor to transfer control from the loading code to the kernel code, and wherein after control is transferred to the kernel code, the second set of hypervisor page tables is active.

20. A non-transitory machine-readable medium comprising a plurality of machine-readable instructions that when executed by one or more processors is adapted to cause the one or more processors to perform a method comprising:
receiving, by a hypervisor, a request to modify a memory permission of a guest running on a virtual machine, the virtual machine and hypervisor running on a host machine, and the guest including a kernel that includes loading code and kernel code;
determining, by the hypervisor, whether the request was sent from the loading code, the loading code corresponding to a first set of hypervisor page tables and being stored at a first range of memory addresses, the kernel code corresponding to a second set of hypervisor page tables, and the first range of memory addresses being in an executable mode in the first set of hypervisor page tables; and in response to a determination that the request was sent from the loading code, modifying, by the hypervisor, the guest's memory permission in the second set of hypervisor page tables in accordance with the request.

\* \* \* \* \*